(12) United States Patent
Goodin

(10) Patent No.: US 8,285,648 B2
(45) Date of Patent: Oct. 9, 2012

(54) SYSTEM AND METHOD FOR VERIFYING A USER'S IDENTITY IN ELECTRONIC TRANSACTIONS

(75) Inventor: Stewart Goodin, Coquitlam (CA)

(73) Assignee: Dan Scammell, Coquitlam, British Columbia (CA)

( * ) Notice: Subject to any disclaimer, the term of this patent is extended or adjusted under 35 U.S.C. 154(b) by 0 days.

(21) Appl. No.: 12/443,426

(22) PCT Filed: Sep. 14, 2007

(86) PCT No.: PCT/CA2007/001639
§ 371 (c)(1),
(2), (4) Date: Mar. 27, 2009

(87) PCT Pub. No.: WO2008/037062
PCT Pub. Date: Apr. 3, 2008

(65) Prior Publication Data
US 2010/0030698 A1    Feb. 4, 2010

(51) Int. Cl.
*G06Q 20/00* (2006.01)
(52) U.S. Cl. .............................. 705/76; 705/44; 726/28
(58) Field of Classification Search .................. None
See application file for complete search history.

(56) References Cited

U.S. PATENT DOCUMENTS

| | | | |
|---|---|---|---|
| 5,592,611 A * | 1/1997 | Midgely et al. | 714/4 |
| 6,012,144 A | 1/2000 | Pickett | |
| 6,018,724 A | 1/2000 | Arent | |
| 6,223,209 B1 * | 4/2001 | Watson | 709/201 |
| 6,298,373 B1 * | 10/2001 | Burns et al. | 709/203 |
| 6,631,849 B2 * | 10/2003 | Blossom | 235/492 |
| 6,636,808 B1 * | 10/2003 | Brown et al. | 702/3 |
| 6,749,114 B2 | 6/2004 | Madani | |
| 6,827,260 B2 | 12/2004 | Stoutenburg | |
| 6,868,391 B1 | 3/2005 | Hultgren | |
| 6,954,740 B2 | 10/2005 | Talker | |
| 7,080,041 B2 | 7/2006 | Nagel | |
| 7,100,821 B2 | 9/2006 | Rasti | |
| 7,155,411 B1 | 12/2006 | Blinn | |
| 7,171,694 B1 | 1/2007 | Jespersen | |
| 7,177,830 B2 * | 2/2007 | Shields et al. | 705/35 |
| 7,184,747 B2 | 2/2007 | Bogat | |
| 7,487,112 B2 * | 2/2009 | Barnes, Jr. | 705/26 |
| 2002/0010679 A1 * | 1/2002 | Felsher | 705/51 |

(Continued)

FOREIGN PATENT DOCUMENTS

KR    1020010087564    9/2001

(Continued)

*Primary Examiner* — Jamie Kucab
(74) *Attorney, Agent, or Firm* — Denis R. O'Brien

(57) ABSTRACT

In an electronic transaction, the invention provides a process and system for blocking a user's account until a verifier verifies the identity of the user. The process comprises pre-enrolling the user and the user's personal communication device. Optionally, one or more of the user's accounts are enrolled.

At the time a transaction is initiated, the verifier sends an identification verification request to the portable communication device of the person initiating the electronic-transaction. The person then verifies his/her identity as the user. Optionally, the user authorizes the amount of the transaction. Optionally, the verifier issues to the user a proxy transaction card which the user uses to initiate electronic transactions that will be billed to one of the user's pre-enrolled accounts. Using information obtained from the user's proxy transaction card, the retailer/merchant's bank opens a communications link to the verifier, and the verifier then verifies the user's identity.

19 Claims, 5 Drawing Sheets

U.S. PATENT DOCUMENTS

| | | |
|---|---|---|
| 2002/0023217 A1* | 2/2002 | Wheeler et al. ............... 713/171 |
| 2002/0035539 A1 | 3/2002 | O'Connell |
| 2002/0062249 A1* | 5/2002 | Iannacci ......................... 705/14 |
| 2002/0147683 A1* | 10/2002 | Capobianco et al. ........... 705/41 |
| 2002/0152380 A1 | 10/2002 | O'Shea |
| 2003/0014372 A1* | 1/2003 | Wheeler et al. ................ 705/71 |
| 2003/0032409 A1 | 2/2003 | Hutcheson |
| 2003/0061163 A1 | 3/2003 | Durfield |
| 2004/0019564 A1 | 1/2004 | Goldthwaite |
| 2004/0039692 A1* | 2/2004 | Shields et al. .................. 705/39 |
| 2005/0105735 A1* | 5/2005 | Iino et al. ....................... 380/277 |
| 2005/0278542 A1* | 12/2005 | Pierson et al. ................. 713/182 |
| 2007/0034685 A1 | 2/2007 | Botham |
| 2007/0143230 A1 | 6/2007 | Narainsamy |
| 2008/0167001 A1 | 7/2008 | Wong |

FOREIGN PATENT DOCUMENTS

| | | |
|---|---|---|
| KR | 1020020096353 | 12/2002 |
| WO | WO 02/07100 | 1/2002 |
| WO | WO 2006/094316 | 9/2006 |

* cited by examiner

SYSTEM AND METHOD FOR VERIFYING A USER'S IDENTITY IN ELECTRONIC TRANSACTIONS

BACKGROUND OF THE INVENTION

1. Field of the Invention

The invention relates to systems for and methods of verifying the identity of persons initiating electronic transactions 2. Definitions The following definitions are provided in order to set forth the intended scope and meaning of certain terms used in this disclosure and in the claims. Examples used in the definitions are intended to illustrate and clarify the definitions, and not to limit the definitions or the scope of the terms defined. The terms defined here include plural forms, singular forms, and grammatical congeners and alternatives.

"Electronic transaction"—includes a request for goods or services including, where relevant, an offer to pay for the goods or services, and a response to the request, wherein some step in the request and/or response involves the electronic communication of information. "Services" is defined broadly to include any requested action. "Electronic transaction" as the term is applied herein applies to transactions involving goods, services/actions of virtually any type. Although credit card transactions are a common example electronic transactions used herein to describe preferred embodiments of the invention, other examples of electronic transactions that fall within the scope of the invention include, by way of example, providing access to a secure space such as a room, vehicle, building, deposit box, or storage facility; providing secured and non-secured credit; providing banking services or other financial services; providing permission to cross national borders.

"Person"—includes individuals, entities, and collections of individuals or entities.

"User," "customer," and "payer"—are used interchangeably to refer to persons who seek to obtain goods or services through an electronic transaction. "Customer" and "payer" are preferred when referring to retail transactions; "user" is preferred when referring to non-retail transactions. "User-computer" refers to a computer to which a user has access for carrying out various steps of the method of the invention.

"Provider" has a broad and general meaning in the disclosure and the claims to include systems and subsystems of individuals and entities who provide goods and services to a user though an electronic transaction, including derivative or implicit services provided by third parties. In an electronic credit card transaction, for instance, the term "provider" includes the retailer, merchant, or other payee who is providing and being paid for the goods or services being purchased, and also the subsystem of various third party banking entities that provide the derivative services of advancing the credit being requested by the customer when the customer tenders her credit card.

"Bank" is defined functionally to refer to an entity or group of entities interacting to provide financial services related to an electronic transaction, including extending credit, transferring funds, and administrating financial accounts. The term also includes systems and sub-systems of such entities interacting to provide financial services, for example, payment transfer associations or credit card companies such as VISA® and MasterCard®. Thus, the term refers to a set of functions carried out by financial institutions in processing electronic transactions.

"Verifier" is defined functionally to refer to an entity that provides identity verification services as a part of an electronic transaction. The verifier may assume an independent existence from the parties conducting the transaction, as in a corporation that provides identity verification services for a fee. Alternatively, the verifier function may be subsumed by a goods and services provider, a bank, credit card company, or by another party to the transaction. In the figures and disclosures below, the representation of the verifier as separate from the provider is not meant to imply that the entities are necessarily distinct, but rather to illustrate the point that the functions of the verifier are distinct from the functions of the bank and the provider. Similarly, the term "verifier-computer" is functionally defined to mean whatever computer, server, or network is providing the verification functionality of the invention, regardless of where the computer, server, or network is physically located or who owns or controls it. A step that is to be taken by a "verifier-computer" is to be deemed equivalent to a step that is to be taken by the "verifier," and vice versa.

"Verifier-database" refers to a compilation of user records that is accessible by a verifier-computer.

"Communications device"—is intended broadly to include communications devices of any nature linked in a communications system, through which communications system a first person or software application communicates with a second person or software application. The term includes computers linked to the Internet, telephones linked to land-line systems and cell phones and the like linked to wireless systems. "Personal communications device" refers to a communications device sufficiently small and mobile to be carried by a user, including, without limitation, cell phones, PDA's, wireless computers, Blackberry® devices, Bluetooth® devices, pagers, beepers, and other personal devices having wireless transceiver capabilities.

"Local software"—refers to software accessed by the user-computer in carrying out the invention. Local software "performing" a step refers to the user-computer carrying out the specified function as directed by the local software.

"User access number"—an alphanumeric or other data representation used to access a user's communications device.

"Identity Verification Request (IVR)"—an electronic request initiated by a verifier and sent to a user asking the user to verify the user's identity.

"Secure identifier"—a generic term for a secure data representation used to identify a person. The term includes, by way of example, secure alphanumeric representations, passwords, codes, secret numbers, PINs, passwords, or digital representations of biometric features that can be used to identify a person or entity. In the examples provided, the use of "password" is not intended to exclude other types of secure identifiers and is, in fact, intended to be representative of the genus. The term "putative secure identifier" refers to a secure identifier that is offered in response to an IVR. A "bona fide secure identifier" refers to a known valid secure identifier to which a putative secure identifier is compared.

Existing Art

The present invention solves the complex problem of how to verify the identity of a person initiating an electronic transaction.

The most commonplace electronic transaction is of the type initiated by a customer swiping a credit card through a point of sale card reader, thereby making a primary request to purchase goods or services. Such a request also includes, an implicit or derivative request that credit be extended to the customer or that funds be transferred from the consumer s account to the account of a merchant or service provider. Other examples of electronic requests include the use of a coded card or biometric features to gain access to a room or building; the use of a coded card in automated teller machines (ATMs); and online commercial transactions in which an account number is provided through the Internet to an online merchant.

Because such electronic requests are extremely convenient for all parties involved, many of the fraud and security problems presented by electronic transactions are ignored or disregarded. Consequently, identity theft, which occurs when a person's personal and financial information is obtained and used by unauthorized persons, has become an enormous and growing problem. In 2004 the US Federal Trade Commission estimated that the annual losses to business as a result of ID theft was about $50 billion. The cost to individuals was about $5 billion. VISA® and MasterCard® reported fraud-related losses in 2000 of $114 million, with approximately a 10% annual increase over the previous four years. Identity theft related losses in Canada increased 2.6-fold in just 1 year—from $8.5 million to $21.5 million, 2002 to 2003.

During roughly the same period that the use and abuse of electronic transaction technology has increased, there has been an even greater rate of increase in the use of portable communications devices, most notably cellular telephones. In the 33 years following Martin Cooper's first wireless call from a hand-held mobile phone in 1973, the number of cell phones in use has grown to more than 2.5 billion world wide—a number presently approaching 50% of the entire human population. In many countries the number of cell phone subscriptions significantly exceeds 100% of the population. No other electronic technology is as ubiquitous or as universal as portable communications; consequently, no other electronic technology is better placed to be exploited for security enhancement.

Many approaches to resolving security problems related to electronic-transactions have attempted to combine electronic communications technology and secured identifiers. For instance, U.S. Pat. No. 6,954,740 to Talker discloses a system in which credit card signatures and check transactions are verified by transmitting the PIN with the transaction request. U.S. Pat. No. 6,868,391 to Hultgren discloses a system in which a customer initiating an electronic-transaction calls a verifying entity from a point of sale (POS) and gives the verifying entity a PIN, which PIN the verifying entity compares with a known valid PIN. While such systems may provide worthwhile enhancements to security for electronic-transactions, they are generally difficult or inconvenient to implement, particularly from the customer's point of view. For instance, Hultgren requires the customer to contact the verifying entity by placing a call to the verifying entity, which requires knowing and inputting the verifier's phone number and then waiting for the call to be answered and processed.

What is needed is a method of and system for verifying the identity of a user during an electronic-transaction wherein the method is easy to implement, easy to use, and substantially transparent to the user, and yet flexible enough to be used anywhere in the world without the user having to make or initiate calls to a verifying entity.

BRIEF SUMMARY OF THE INVENTION

The present invention is a system and a method of applying portable communications technology to resolving the problem of providing accurate user identity verification in electronic-transactions. While the method has many applications, embodiments and embellishments, some of which are disclosed below, the basic method comprises a minimum of a provider who provides goods or services, a user or customer who seeks to acquire the goods or services by means of an electronic-transaction, and a verifier who acts as a gate-keeper that blocks each transaction unless the requester's identity is adequately verified.

With respect to the method of the invention, a user and the user's communications device are pre-enrolled in a verification program administered by the, bank, verifier, or other entity. One or more of the user's accounts are also pre-enrolled in the verification program. These pre-enrollments comprise entering information into a verifier-database and downloading local software to a user-computer that is integrated with or otherwise coupled to the user's communication device. Pre-enrolling an account may be as simple as setting a flag in a database record, such that the flag indicates whether attempts to access that account are to be subjected to the user verification steps disclosed herein, or it may include entering the account's number and access authorization data into the verifier-database so that the verifier may act as a proxy for the user in accessing the account. Optionally, pre-enrolling the account additionally or alternatively entails setting a flag in a database record that indicates whether or not attempts to access the account are to be subjected to transaction authorization steps disclosed herein.

As a result of the pre-enrollment process, the information stored in the verifier-database is accessible by a verifier-computer, which is adapted to write data to and retrieve data from the database. The user's record in the verifier-database entry includes a bona fide secure identifier for the user and the user access number of the user's communication device. In applications of the invention related to financial transactions, the database also contains the various flags that determine what accounts are to be subjected to identity verification and transaction authorization.

When the user (or anyone else) attempts to access a flagged account, a signal is sent from the merchant to the verifier-computer, which then attempts to open a communications link with user's communication device using the user access number stored in the verifier-database. Once a communication link to the user's communication device is open, the verifier-computer sends an encrypted identification verification request ("IVR") to the user's communication device. The user-computer, which is coupled to the communication device and to an input/output ("I/O") device, is adapted to receive the IVR and processes it, including decrypting the IVR and displaying it on the I/O device which accepts input from the user and displays output to the user. The user-computer is also adapted to acquire the user's input and to send a response to the IVR based on the user's input. If the person in possession of the user's communication device is the bona fide user, she responds to the IVR by inputting a (correct) putative secure identifier into the I/O device. In one embodiment the putative secure identifier is encrypted by the local software on the user's communications device and sent to the verifier-computer over the open communication line. The verifier-computer receives the putative secure identifier, decrypts it, and compares it to the bona fide secure identifier retrieved from the database. If the comparison results in a match between the putative secure identifier and the bona fide identifier, the verifier computer removes the block on the transaction so that the transaction can be processed to completion.

Optionally, the method of the invention includes the additional step of the user authorizing the specific electronic transaction at hand, which step is referred to herein as "a transaction authorization" in order to distinguish it from the user identity verification step. Depending on the specific application of the invention, this authorization step can be completed simultaneously with the identity verification step, or completely separately as, for instance, when the verifier-computer sends a second encrypted request—called a transaction authorization request—to the user's personal communications device. The transaction authorization request is displayed on the I/O device of the communications device, so that the user can verify the amount of the transaction, the merchant, and other details. In order to authorize or deny the transaction, the user sends a response to the transaction authorization request, which may be nothing more than pressing the "return" key. If the response is to authorize the transaction, then the block is removed and the transaction proceeds. In some applications, the user's identity is verified prior to the user authorizing the transaction. In other applications it is more efficient to perform the transaction authorization step prior to identity verification.

The effect of the method is to exploit the combination or the user's cell phone number and secure identifier to erect additional security barriers in electronic-transactions. If a user's credit card is stolen or misappropriated, any attempt by the thief to initiate a transaction with that card will result in an immediate notification of the user when the verifier-computer sends the IVR to the user's cell phone. The thief who attempts to use the card does not even know that he has caused his victim's phone to ring, thereby notifying the user that someone is attempting to initiate a transaction with his card. Even if the user's cell phone and credit card are both stolen or appropriated, any electronic transactions initiated by the thief with that credit card will fail unless the thief knows the user's secure identifier. In addition, because of the GPS locating functions now universal on cell phones, any attempted false verification query can automatically trigger a tracking routine to immediately locate the stolen cell phone.

Various embodiments of the method expand its utility significantly. For instance, the method can be adapted to permit the verifier to control electronic transactions initiated by one party in behalf of a second party. For instance, if an employee carries a company credit card, the verifier-computer sends the IVR to the employee's cell phone at the point of sale. Upon verification of the employee's identity, the verifier-computer then sends the transaction authorization request to the employer's land line or cell phone, whereby the employer is notified that the transaction has been requested and can then elect to authorize it or deny it prior to the transaction being completed.

In another optional embodiment, the verifier issues its own proxy transaction card to the user, which proxy transaction card is used to initiate user identification verification and then pass the transaction through to the user's credit card account, thereby avoiding the need of the user to carry the credit card and allowing information to flow between the merchant bank and the verifier directly without involvement of the user's bank. The verifier thus acts as a gateway to one or more of the user's accounts, and the gate can only be opened if the user enters a correct secure identifier into the user's communication device in response to an IVR from the verifier.

BRIEF DESCRIPTION OF THE FIGURES

The above and other objects, features and advantages of the invention will become more apparent from the following description taken in connection with the accompanying drawings, in which.

DETAILED DESCRIPTION OF PREFERRED EMBODIMENT

The Method—Phase I: Pre-Enrollment

Because the method of the invention has enormous flexibility and potential to be used in a wide variety of settings, it is not possible to disclose all potential applications. Disclosed here is a relatively simple embodiment of the method and system of the invention that represents a best mode presently known to me for practicing the invention. Then a number of variations and embellishments are disclosed in order to illustrate the flexibility of the invention. From these disclosures one with ordinary skill in the art will be able to practice the invention and apply it to obtain many diverse and useful ends.

Figure 1:
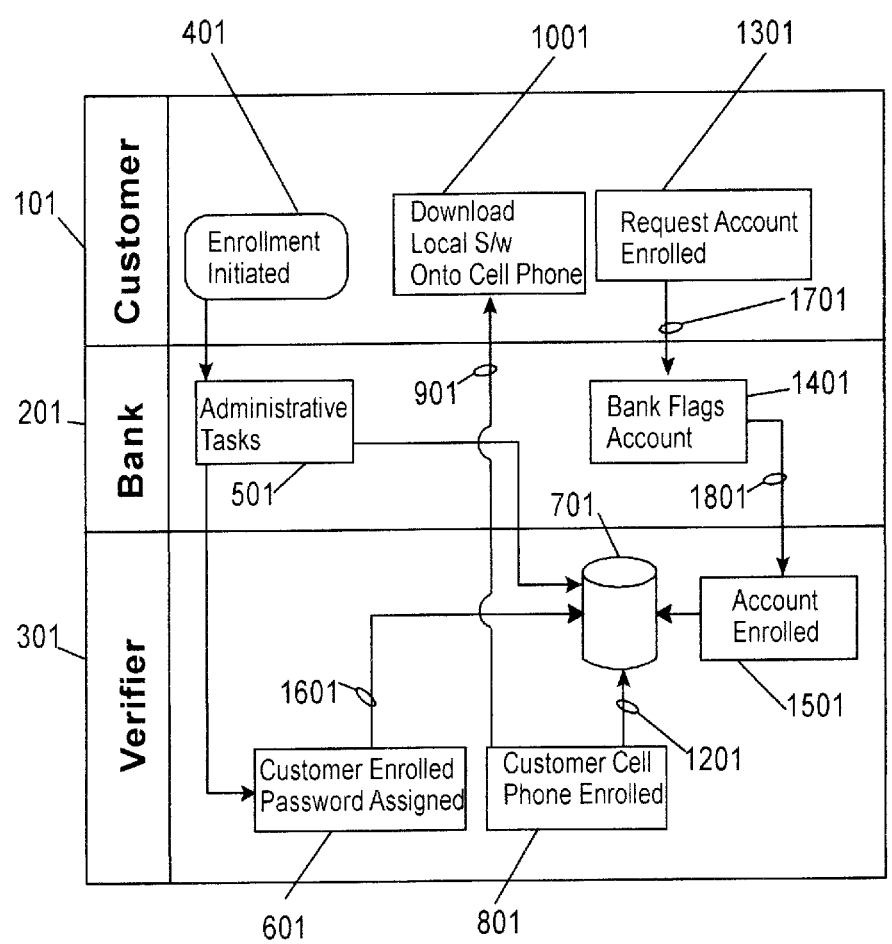
FIG. 1 is a diagram showing pre-enrollment steps of the method of the invention.
Figure 2:
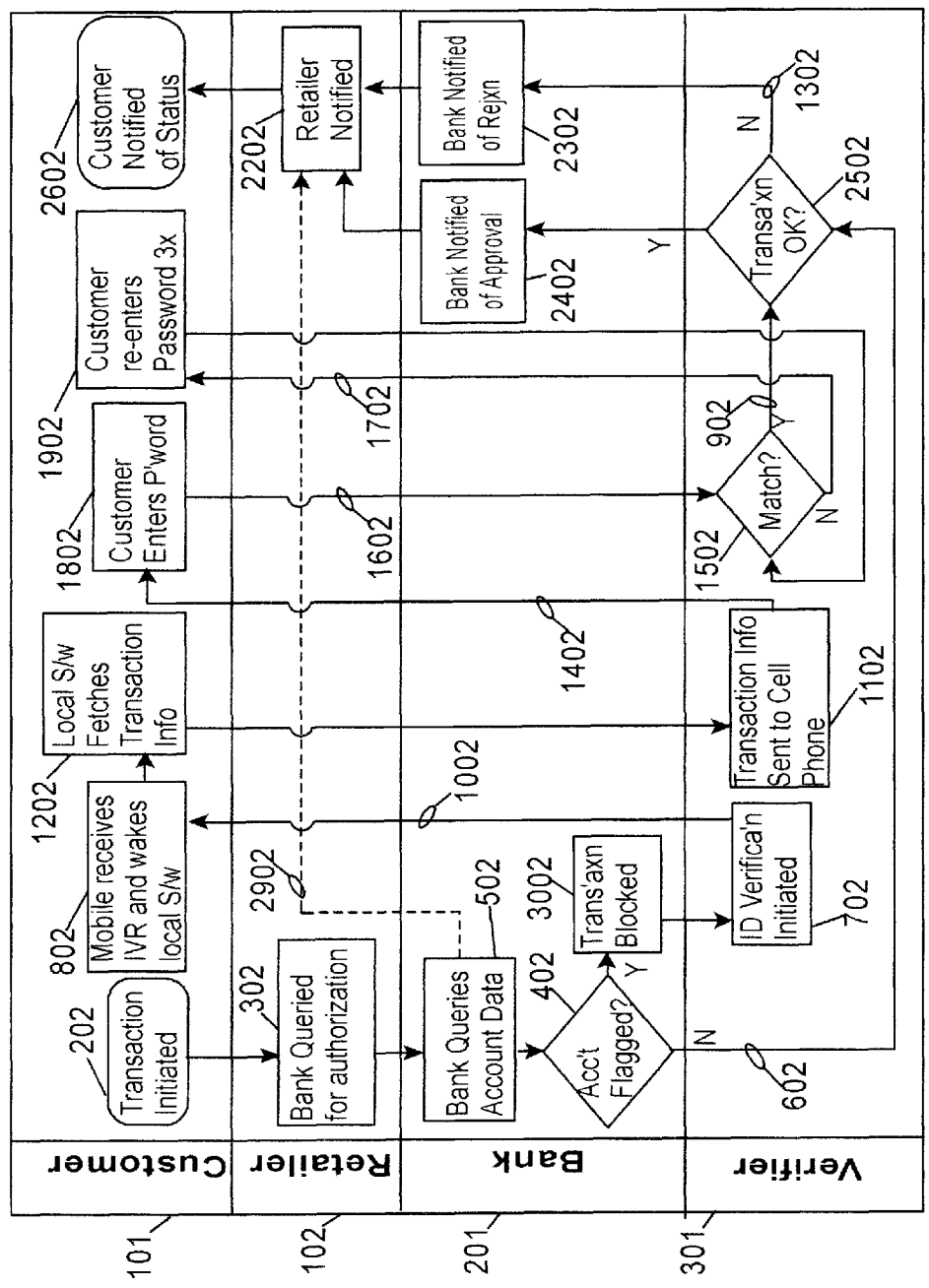
FIG. 2 is a flow chart of the method of the invention applied to a credit card electronic-transaction.
Figure 3:
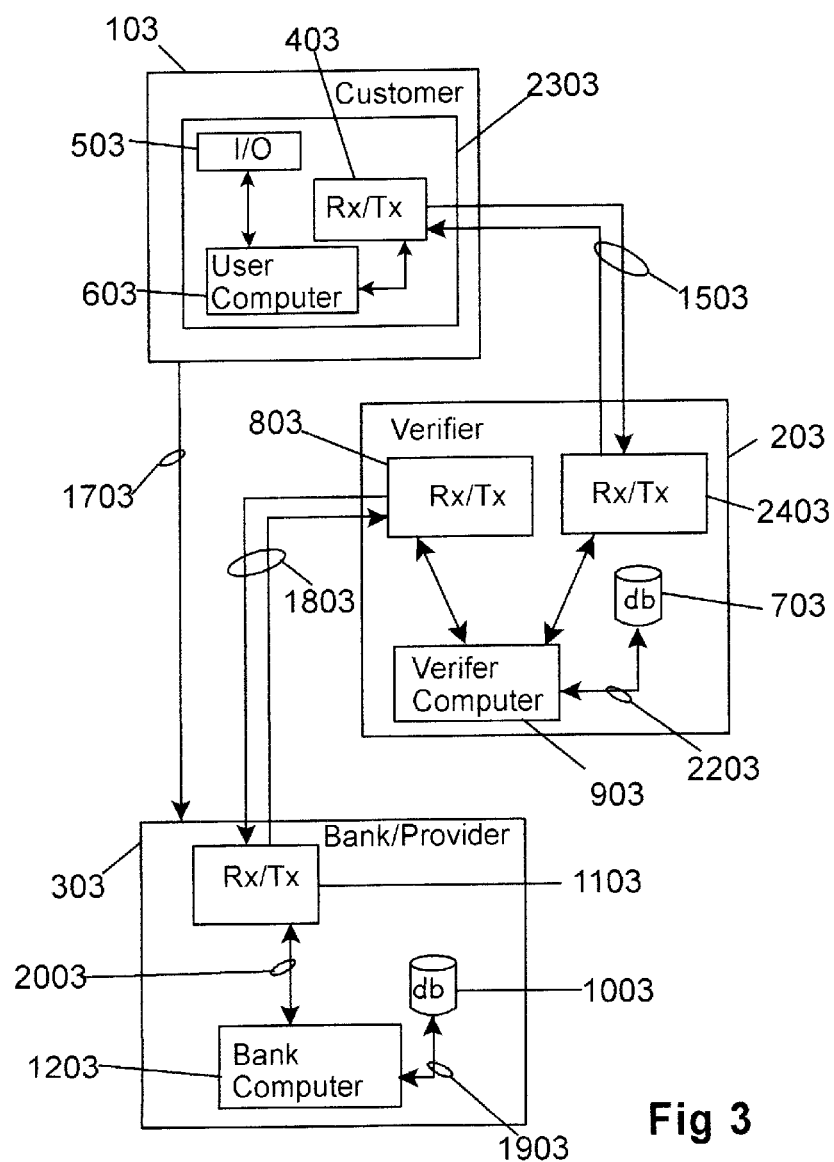
FIG. 3 is a diagram of the various components of the system and their interactions.

The example illustrated in FIGS. 1-3, shows how a person, referred to herein as the "customer," or "payer" uses the invention to protect a credit card account, for instance one administered by a payment transfer association such as VISA® and MasterCard®. As noted above, such financial entities are referred to herein generically and collectively as the "bank." The customer's presentation of the credit card to the retailer, merchant, or other payee constitutes both an offer to purchase goods/services and a request for extension of credit on the customer's account to pay for the goods/services. FIG. 1 illustrates the process of pre-enrolling the user, her communications device, and her accounts in a verification program. FIG. 2 illustrates the process of using the invention to verify the user's identity during an electronic transaction.

Referring first to FIG. 1, which sets forth a preferred embodiment of how the customer 101, bank 201, and verifier 301 interact to carry out the pre-enrollment process, in the preferred embodiment, the verifier 301 provides software and a server to the bank 201. The bank is thus in physical control of the "verifier-computer" in the sense that the verification software and related hardware are physically on the bank's premises and operated by the bank. The process is initiated 401 by the customer contacting the bank seeking user identity verification services. The bank completes necessary administrative tasks 501, such as logging the request, verifying the customer's identity, and the like. The resulting data are updated in a database 701.

The customer is pre-enrolled in the verification program by providing 601 to the verifier the required data, including identity information, and information that can be used to electronically retrieve a lost password. The customer is assigned a bona fide password. All of this information is written 1601 to a record for the customer in the verifier-database 701. Although the verifier-database and the bank's database are represented as a single entity in the figure, it is to be understood that the physical embodiment of databases may be implemented as distinct databases running on distinct servers, as discussed in detail below.

The next step is to pre-enroll a cell or mobile phone 801, to which the customer has access. First, the user provides to the verifier the user access number that can be used to open a communications link with customer's mobile phone, and the verifier stores 1201 the user access number in the database 701. The verifier then calls 901 the mobile phone using the user access number provided. The verifier then downloads 1001 local software through this open communications link to the user-computer integrated in the user's phone. This local software is required during the verification process, as described below. It is to be noted that the user-computer may be a stand-alone computer, or may be a computer integrated into any of a number of types of communication devices, depending on the specific implementation of the invention. At this point the verifier can optionally also acquire from the mobile phone a device identification information that can be used to identify that particular phone. In embodiments in which the user-computer is a laptop computer, PDA, or other computer instead of a mobile communications device, the serial number of the computer's CPU can be acquired by the verifier. These communications device data are then written 1201 to the database 701.

The final phase of pre-enrollment is pre-enrolling 1301 the specific accounts to be protected by the service. The customer determines which of her accounts she wishes to be protected by the user identity verification service. Transactions with these accounts will be thereafter blocked until the verifier verifies the customer's identity during each individual transaction. The customer 1701 nominates the account or accounts that are to be enrolled. The bank flags the nominated accounts 1401 and notifies 1801 the verifier. The verifier pre-enrolls the accounts 1501 by making the appropriate entry in the database 701. Alternatively, the bank may maintain the verification flag in its database and then notify the verification service each time an attempt is made to access the flagged account. The most efficient way of flagging the accounts will be determined by the specific application and the resources of the parties. The essential point is that transactions using the nominated accounts are blocked from proceeding until the verifier verifies the customer's identity.

In the present example only one person, the customer, initiates electronic transactions. However, if there are to be multiple potential users of the account, their ID data, and cell phone numbers are also provided to the verifier at 601 and entered into the database 701.

The foregoing pre-enrollment process can be easily and conveniently initiated by the customer online or through landline and/or wireless communication systems. The software download step 1001 is most conveniently carried out by the verifier opening a communications link with the customer's cell phone. The entire pre-enrollment process is completed in a matter of minutes. Even if the verifier is a distinct entity from the bank, it is not necessary for the pre-enrollment process to directly involve the verifier. The bank may carry out the pre-enrollment process itself, in which case the verifier remains unseen by the customer. For instance, an identity verification company may contract with a bank to provide the bank with software and servers necessary for carrying out the method of the invention. But if the bank then administers the identify verification process, the bank would be fulfilling the functions of both "bank" and "verifier," as those terms are used herein.

It is to be emphasized that the sequence of the pre-enrollment process is not fixed and is amenable to considerable flexibility. Flagging the account 1401, for instance, may be carried out as soon as the customer requests pre-enrollment 401.

The Method—Phase II: Customer Identity Verification

FIG. 2 shows a sequence of steps by which the customer 101 wishes to use the account pre-enrolled with verifier 301 in order to obtain an extension of credit from bank 201 as a part of the transaction to purchase goods/services from retailer 102.

The customer initiates an electronic transaction 202 by presenting her card to retailer 102. The card is swiped through a card reading device, thereby sending an electronic communication 302 to the bank 201, through, for instance, a public switch telephone network (PSTN) as is now commonly done. The bank queries 502 the customer's account information in its database to see if there is sufficient credit or funds to complete the transaction. If there is a problem, the transaction can be terminated and the retailer notified 2902, otherwise the bank interrogates the database to determine whether the customer's account is flagged 402; i.e., to require verification.

If the account is not flagged 602, the transaction by-passes the user identity verification steps and continues normal authorization procedures 2502.

In the present example, the customer has pre-enrolled the account for verification services according to FIG. 1, and so the account has been flagged. Consequently, the transaction is blocked 3002 pending verification of the customer's identity. A message is sent from the bank to the verifier to initiate the identity verification process 702. The verifier retrieves from its database the user access number for the customer's mobile phone and opens a communications link 1002 with the mobile phone of the customer, using, for instance, a wireless protocol and network. An interrogation signal is sent to the customer's mobile phone, which signal is received by the customer's mobile phone and awakens the local software 802 that was downloaded on the phone during pre-enrollment 1001 (See FIG. 1). If the phone is turned off, or not answered, then the verification process fails and the transaction is terminated because by default the transaction is blocked 3002. Similarly, if at any time prior to completion of the identify verification process the call is "dropped" or the communications link is otherwise broken, as a result of being "timed-out" for instance, the transaction will fail for the same reason.

If the customer's phone is answered, the user-computer automatically seeks transaction information from the verifier-computer 1202, and the verifier-computer responds 1102 by sending 1402 the transaction information to the user-computer, which information includes an identity verification request (IVR). The user-computer receives the IVR and formats it for display on the user's I/O device.

The format of the IVR will depend on the available and preferred technologies and the type of portable communication device, but presently in most areas a text message is preferred. The IVR is, in its essence, an invitation for the customer to input her password.

The verifier-computer may optionally acquire from the user's phone a device identification number and compare it to the device identification number recorded in the database to ensure the proper communications device has been contacted. This step may conveniently be performed when the user-computer seeks the transaction information 1202.

The customer enters a putative password 1802 into the I/O device of her mobile phone, which password is formatted by the user-computer and sent 1602 to the verifier-computer in response to the IVR. The putative secure identifier is received by the verifier-computer and compared 1502 with the bona fide password the verifier-computer retrieves from database 701 (See FIG. 1).

If the putative password and the bona fide password do not match, a "cannot confirm" message is sent 1702 to the user-computer asking for the customer to try again. After a pre-set number of failed attempts, the transaction is terminated and the bank is notified 1302. At this point, a number of protective or remedial actions can be taken by the bank, the retailer, and/or the verifier, such as calling the customer's land line to inform her of the failed transaction, contacting the police, blocking the account from any further transaction attempts, or confiscating the card. Depending on the specific application, if the communications link is dropped before the putative password is verified, the event can be handled as a security breach or the transaction can simply be terminated with appropriate notice to the bank and/or retailer.

If the bona fide password and putative password match, an "identity verified" signal 902 is generated, the block 3002 on the account is lifted, and the transaction is allowed to proceed, including notifying the bank 2402, notifying the merchant 2202, and sending a confirmation to the customer's mobile phone 2602.

Transmissions between the user-computer and the verifier-computer are encrypted. The local software automatically decrypts incoming traffic and encrypts outgoing traffic without any input from the customer. Nor is the customer required to know the phone number of the verifier or dial that number because the communication line is opened by the verifier's call to the customer's phone, and the local software in the customer's phone automatically identifies the incoming messages from the verifier, displays the messages on the phone's I/O device, formats the outgoing information, and transmits it to the verifier.

The Method—Phase III: Transaction Authorization and Completion

At node 2502 of FIG. 2 the customer's identity has been verified, and the transaction can proceed to completion. In many embodiments of the invention the IVR includes, either implicitly or explicitly, a request that the transaction be authorized, and this authorization is effectuated by the customer entering her secure identifier 1802. In other embodiments it is desirable to have the customer authorize the transaction in a distinct step. This is done by the verifier-computer transmitting to the user-computer a request for authorization and waiting for the customer to provide the appropriate response. If the customer indicates she does not authorize the transaction, or the call is terminated, the transaction fails.

At steps 2402 and 2302 the bank is notified of the outcome of the identity verification procedure and any optional transaction authorization steps. At step 2202 the retailer is also notified of the status of the transaction, and at step 2602 the customer is notified, which may occur immediately through the customer's mobile phone, or at some point in the future through, for instance, the customer's monthly statement. If the transaction has been approved, it is then completed.

The System

The system of the invention comprises hardware and software components in a novel and non-obvious combination that effectuates the method summarized in the example above. Given the enormous flexibility and wide applicability of the invention it is not possible to describe, or even anticipate, all of the forms or embodiments the invention can assume. Disclosed here is a rather elementary embodiment of the system upon which those of skill will be able to make many obvious alterations and improvements within the scope of the disclosure.

FIG. 3 presents a diagrammatic summary of the primary components of the invention and how they interact, using the example of a credit card transaction.

A customer 103 has a communications device such as cell phone 2303 or other mobile communications device comprising a wireless transceiver 403, local software is run by a user-computer 603, and an I/O device 503 for interfacing the mobile communications with the customer. The user-computer is coupled to the I/O device and the transceiver and is adapted by virtue of the local software to display the incoming IVR on the I/O device, format the customer's response to the IVR as outgoing data, and send the outgoing data through the cell phone's transceiver to the verifier.

The user-computer of the communications device 2303 is adapted to access communications link 1503 which is a wireless link with a first communications device 2403 of verifier 203. This first verifier communications device is coupled to verifier-computer 903. The verifier-computer is adapted by software to access verifier-database 703 such that the verifier-computer can read data from and write data to the verifier-database, including data received and transmitted by the verifier first communications device 2403 and the verifier second communications device 803.

Second verifier communications device 803 is adapted to communicate with the bank/provider communications device 1103 through communications link 1803. This communications link can be implemented as a wireless link or a land-line network such as PSTN. While it is technically possible to combine the first and second transceiver functions of the verifier communications devices, the flexibility and enhanced communications speed of separating these functions makes this approach preferred when utilizing technology commonly available today.

Depending on the implementation, either the user-computer, the verifier-computer, or both, are adapted to receive as a first input a bona fide secure identifier retrieved from database 703, receive as a second input a putative secure identifier input via the customer's I/O device 503, compare the first input with the second input, and produce a confirmation output that indicates whether the first input matches the second input. If there is no match, the transaction becomes or remains blocked from proceeding to completion.

Bank/provider 303 controls accounts access software operated on bank-computer 1203 through which account database 1003 is accessed for reading and writing account data. It is noted that in many applications of the invention the bank/provider provides and administers the identify verification services. In such cases, database 703 and database 1003 may be the same physical database running on one or a plurality of servers. Furthermore, it is to be noted that entity 303 is nominated as "Bank/Provider" in the figure in order to indicate explicitly that there are non-financial applications of the invention in which the provider of goods/services is party to the transaction with or without the involvement of financial services entities. An example of such a non-financial application of the invention is provided below.

According to the preferred embodiment, account database 1003 contains account-specific data such as balances, credit line amounts, activity, and the like. Of particular interest is a flag in each account record that indicates whether or not the account is subject to identity verification of the customer. The account database also contains customer-specific data such as names, contact numbers, billing address, and the like. Account database 1003 is accessible to bank and retailing entities having permission to run the account administration software 1203

In embodiments of the invention in which the verifier is an entity distinct from the bank, verifier-database 703 is directly accessible only by verifier 203. However, under the control of the verifier-computer 903, information flows from and to the bank/provider 303 through the communications link 1803. Likewise, information flows between the user-computer 603 and verifier-database 703 through communications link 1603 and verifier-computer 903. Finally, information flows 1703 from the customer 103 to the bank/provider 303 in the form of a request to initiate an electronic transaction. This communication may be implemented in an electronic or non-electronic manner.

As noted above, the method of the invention comprises optional steps for authorization of the transaction before it is completed. No additional physical elements are required for inclusion of the authorization steps. All that is required is that a bit be set in a field in the customer record in either the verifier-database 703 or the bank/provider database 1003. Alternatively or additionally, the requirement for authorization can be generated by the merchant.

One particularly useful advantage of the system disclosed herein is that it does not require re-programming of merchant POS computers, nor does it require alterations of existing communications networks. Furthermore, the system can be implemented with software adaptations restricted to the verifier-computer and the user-computer.

Details, Variations, and Embellishments

Local Software

The sophistication and breadth of utility of the various embodiments of the invention will be determined largely by the functions that can be carried out by the user-computer implementing local software that is downloaded onto the communications device. Depending on the embodiment, the local software includes functions for: receiving incoming traffic from the verifier-computer, decrypting/encrpyting information flowing into and out of the communications device, displaying information to the I/O device of the user communications device, sending responses to the verifier-computer, comparing putative and bona fide secure identifiers, and maintaining records and logs of verification activity.

The downloading of the local software can be conveniently done through a communications link between the verifier computer and the user-computer, but a number of alternative techniques will be obvious to those skilled in the art after comprehending the disclosures herein. For instance, the software may be downloaded to a chip that is provided by the verifier. Or the communications device may be a dedicated device and the software downloaded at the time of manufacture.

Encryption

Many foreseeable applications of the invention involve the transmission of secure personal and financial information. Consequently, in such applications it is essential that the information being transmitted over wireless networks be encrypted. The various software applications 603, 1203, 903 of the invention all incorporate functionality for encrypting and decrypting information passing through the respective transceivers. Encryption protocols and methods commonly used in the field are acceptable for use. After comprehending the present disclosure, one of ordinary skill in the art will be able to implement encryption/decryption routines for this invention without undue experimentation.

User Communications Devices

Although the embodiments disclosed herein assume that the invention will be implemented on a mobile or cellular phone of a type that is used for normal communications purposes when not being used to verify the customer's identity, the invention can be easily implemented using a dedicated communications device that is supplied to the customer by the verifier. Such a device contains all the necessary functionality within a package no larger than a pager or beeper. Depending on the implementation, the I/O interface with the customer may be as simple as a single LED or beeper or as complex as a streaming text message or voice synthesizer.

Nor is the invention limited by the type of transceiver or communications links employed by any of the entities. Although the use of wireless communications is preferred in many applications—particularly for communications between the verifier and the customer—any communications technology now existing or to be implemented in the future that can be used to carry out the steps of the invention is considered to be within its scope and the scope of the claims.

It will be appreciated from this disclosure that while the preferred embodiment employs a wireless communications link 1503 between the customer and the verifier, the invention is sufficiently flexible that it can be easily implemented without the use of mobile or wireless communications devices. For instance, the customer may have a fixed geographical location and function entirely through a land line telecommunications system. In such situations, communications between the verifier and the customer can be effectuated through a land-line or through an Internet connection using, for instance, an instant messenger type protocol, in which case the customer's computer acts as a receiver/transmitter of the various requests and information required to carry out the invention.

Secure Identifier Processing

In the examples above, the customer transmits her secure identifier to the verifier in response to an IVR. (See FIG. 1, 1602) This is, of course, an encrypted transmission. An equivalent technique is that the verifier-computer retrieves the customer's bona fide secure identifier from the verifier-database 703 and sends the bona fide secure identifier to the user-computer 603 at the time the IVR is transmitted. This is also an encrypted transmission. The user-computer local software compares the bona fide secure identifier received from the verifier-computer with the putative secure identifier the customer inputs in response to the IVR. If the two identifiers match, the user-computer returns a verification signal to the verifier-computer automatically. If the two identifiers fail to match, a non-verification signal is sent. Regardless of whether the verifier sends the bona fide secure identifier to the customer or the customer sends the putative secure identifier to the verifier, in either instance a secure identifier is encrypted, transmitted, and decrypted just one time for each transaction.

A third approach can prove equally satisfactory in some applications of the invention. In this approach, the bona fide secure identifier is downloaded into the customer's cell phone during the pre-enrollment process. The bona fide secure identifier then remains embedded in the phone's software. When the verifier-computer sends an IVR to the user-computer, the customer inputs a putative secure identifier. The user-computer compares the customer's input to the embedded bona fide secure identifier. If there is a match, the user-computer returns a verification signal to the verifier-computer. In many instances, this signal need not be encrypted because it is just a single bit. In such embodiments not involving the transmission of financial information or account numbers, it is thus possible to implement the invention without the need to transmit encrypted data. This may be particularly desirable for implementations employing small dedicated communications devices.

Complex Customer Entities

In one of many possible variations of the invention the customer is a complex entity comprising, for example, a principal and one or more agents. Examples of such complex customers are employer/employee, parent/child, and spouses. What is at issue is that one entity, the agent, initiates an electronic transaction while a separate entity, the principal, is responsible for the transaction and authorizes the transaction.

In this embodiment of the invention, the IVR is sent from verifier-computer to the agent's cell phone, as described above. The IVR is processed by the agent's user-computer, according to FIG. 1. The agent inputs her password, which is sent to the verifier and processed by the verifier-computer 1502. An authorization step then takes place in which verifier-computer retrieves the principal's phone number from the verifier-database, calls the principal, and seeks authorization of the transaction initiated by the agent. If the transaction is authorized, it proceeds to completion; if it is not, it is terminated. This refinement permits the principal to authorize transactions while they are being conducted instead of having to wait until a monthly statement is received and then authorize post facto.

Alternatively, the system can be easily set up so that both the identity verification and the authorization steps are carried out by the principal. In such embodiments the verifier-computer communicates with the principal and verifies the identity of the principal even though it is the agent who has initiated the transaction.

If the principal is at a fixed location, it is not necessary for the principal's communication apparatus be mobile or wireless. For instance, a company's accounting office may be responsible for processing authorization requests from the verifier-computer, in which case an office land-line might be most convenient for communicating with the verifier-computer. Nevertheless, both the agent and the principal operating through wireless communications is within the scope of the invention and has many advantages.

Non-Commercial Applications of the Invention

After comprehending the foregoing disclosures, the diversity of potential useful applications of the invention will become evident to those skilled in the art. For instance, the invention may be used to verify the identity of a person using an access card to gain access to electronically controlled hotel room or other secured space, wherein the electronic-transaction requested is the opening the door.

Figure 4:
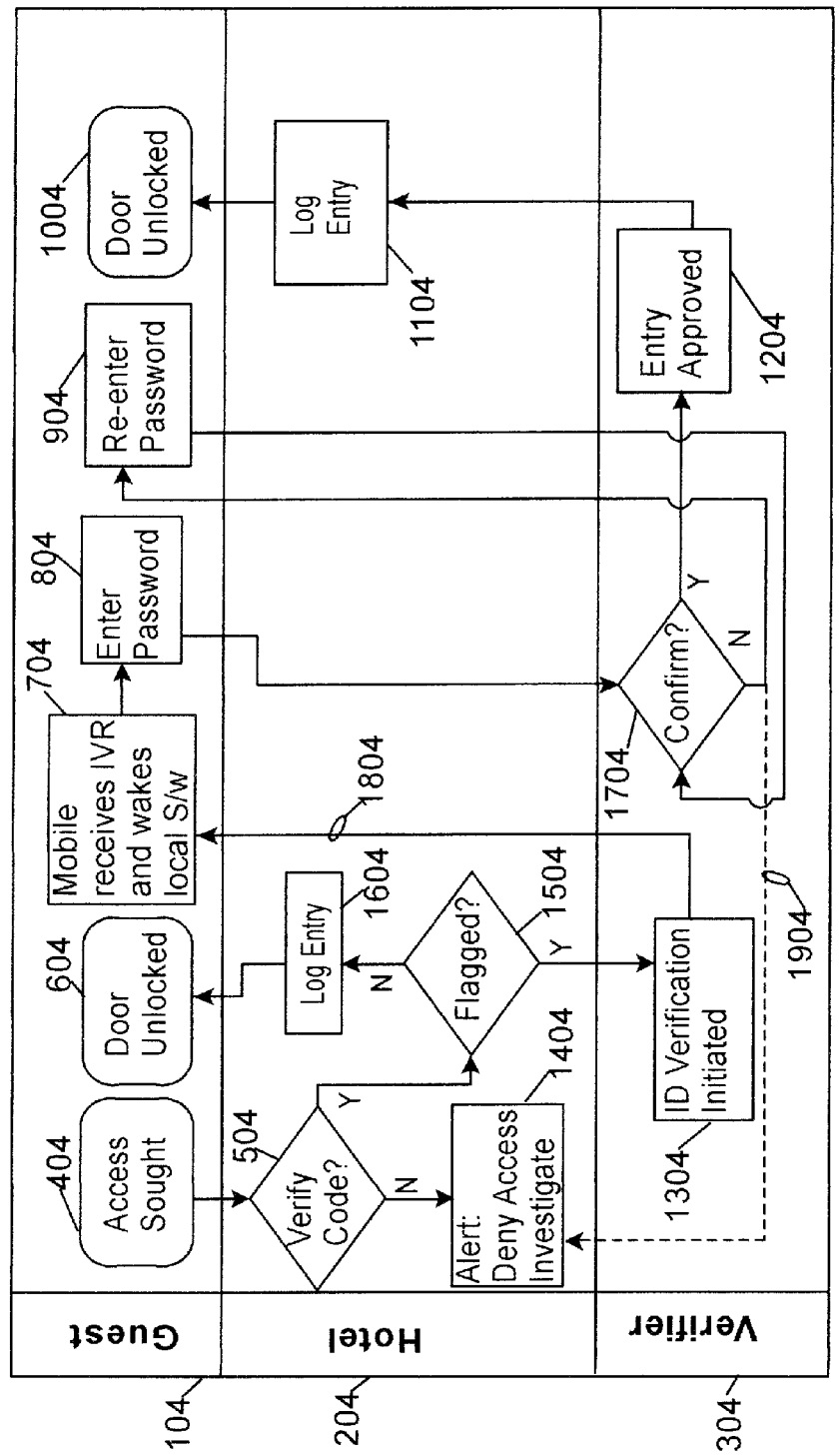
FIG. 4 is a flow chart of the method of the invention applied to an electronic transaction to provide access to a room.

Such a non-financial transaction application of the invention is illustrated in FIG. 4. Guest 104 seeks entry 404 into his room by swiping his key-card. As is commonly done with the existing art, the code is read from the card and verified 504 by a security computer. If the code doesn't match or if some other anomaly exists, an alert is thrown 1404, access is denied, and the situation is investigated by security.

If the code is valid, the hotel's computer then determines 1504 whether the room is flagged as requiring verification of the guest's identity. This may be, for instance, an option requested by the guest when checking in. If there is no requirement for identity verification, the hotel logs the entry 1604, and the room is unlocked 604. If the room is flagged for guest identity verification, then a message is sent to verifier 304, who initiates guest identity verification 1304. Using an user access number for the guest's cell phone, which was previously stored in the verifier-database when the guest checked in, the verifier dials the cell phone of the guest and sends 1804 an IVR to the guest. The guest's cell phone rings 704, and the user-computer awakens, receives the request, processes the request, and displays it on the I/O device of the cell phone. These steps are similar or identical to the credit card example given above, including decrypting the IVR.

If it is not the guest himself who is attempting to gain entry to the guest's room, the guest's cell phone will nevertheless ring and he will be alerted that someone else has his key-card and is trying to gain access to his room. He may then contact the hotel or the police.

Assuming the person trying to enter the room is the guest, the guest inputs a putative password on this cell phone's keypad 804, which input is processed, encrypted, and sent to the verifier-computer. The verifier-computer receives the putative password, decrypts it, and evaluates it 1704 for a match to a bona fide password stored on the verifier-database. If the match fails, the guest is notified and tries again 904. After a pre-determined number of failed attempts, an alert is thrown 1904 and security investigates 1404.

If the putative password is confirmed 1704, entry is approved 1204, the hotel logs the entry 1104, and the door is unlocked 1004.

The example given here of gaining access to a hotel room is easily adapted to gaining access to any space, such as a building, a vehicle, a storage locker, or a safe deposit box.

It will now be appreciated that the invention may be conveniently applied to a wide variety of commercial and non-commercial electronic transactions to obtain services and benefits. For instance, at national borders an immigrant requesting permission to enter a country on a previously obtained visa presents the visa or a passport, which is swiped, thereby initiating a request for identity verification to a verifier, who may be a private company or a government agency. The verifier calls the person's cell phone and sends an IVR to the cell phone. When the cell phone rings and the person enters a secure identifier in response to the IVR, the border agents obtain immediate confirmation of the person's identity. If the cell phone does not ring at all, the border agent will suspect fraudulent papers and take appropriate action. If the phone rings and the person cannot provide a correct secure identifier, the border agent will suspect a stolen phone and stolen papers and take appropriate action.

Verifier-Issued Proxy Transaction Card

Figure 5:
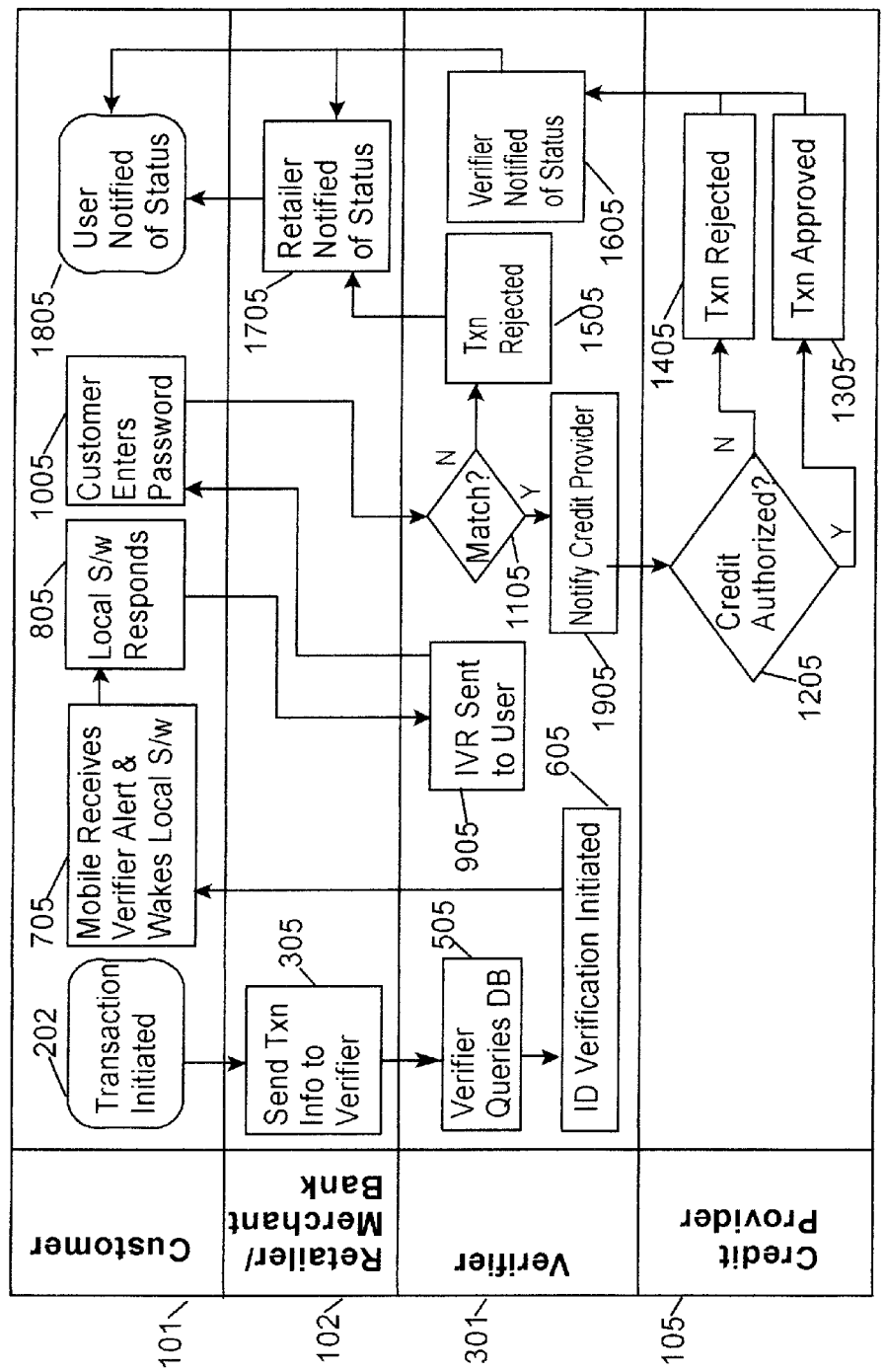
FIG. 5 is a flow chart of the method of the invention based on a verifier-issued proxy transaction card.

FIG. 5 summarizes an embodiment of the method of the invention in which the verifier issues a proxy transaction card to the user, which proxy transaction card replaces one or more of the user's credit cards and is used by the user to authorize the verifier to access one or more of the user's accounts. In this embodiment, during the pre-enrollment phase the user provides the verifier with account access information and a standing authorization to access one or more of the accounts—a VISA®D credit-card account in this example. Enrolling the account may be done by the customer simply giving her VISA® card to the verifier, and the verifier swiping the card through a reader to acquire the account access information and save it to the verifier-database. This credit-card account access information is stored on the verifier-database along with the other data provided by the user during pre-enrollment, as disclosed above. In this embodiment, pre-enrollment, data storage and retrieval, and communications with the credit-card company are all carried out by the verifier company without necessarily involving the user's bank.

After the credit card account data have been entered into the verifier-database, the verifier issues a proxy transaction card to the user. The proxy transaction card is similar in size and shape to a credit card, and it has a magnetic strip attached to it. The magnetic strip on the proxy transaction card need only contain minimal information required to open a communications link between a retailer and the verifier.

To assist in this description, the term "retailer" is used in this embodiment to include both the merchant and the merchant's bank or other financial institution into which the funds will be deposited, as indicated by "Retailer/Merchant Bank" in FIG. 5. Thus, the data read off of the proxy transaction card is sent from the point of sale to the merchant bank, which then opens the communications link with the verifier at 305. These details will vary according to the specific needs of the institutions employing the system, but in any case the flow of information is invisible to the user.

At the point of sale, user 101 initiates a transaction 202 with retailer/merchant bank 102 by presenting the proxy transaction card. The retailer swipes the proxy transaction card through a magnetic reader, which reads the information on the magnetic strip. The retailer inputs the details of the transaction, such as item and amount of purchase. A communications link is opened between the retailer/merchant bank and the verifier-computer using the communications information obtained from the proxy transaction card, and the transaction information is sent 305 to the verifier.

Optionally, the customer may wish for more than one account to be accessed through the verifier's proxy transaction card. In such embodiments, the proxy transaction card magnetic strip contains a "list" of the available accounts and a simple identifier associated with each account, which identifier need not be secure. When the proxy transaction card is swiped by the retailer, the list of available accounts appears on the retailer's screen. The consumer indicates which account should be used and the identifier for that account is sent to the verifier, in the present example: say, VISA® account #1.

Upon receipt of the communication from the retailer, the verifier looks up the user's VISA® account #1 data in the verifier-database 505 and initiates user identify verification 605 using a method similar to the method illustrated in FIG. 2 and disclosed above. Briefly, the verifier sends 705 an IVR to the user's cell phone, which activates the local software downloaded onto the phone during pre-enrollment. The user-computer then responds 805 to the verifier-computer, indicating that the communications link is operating properly. The verifier-computer sends an encrypted IVR to the cell phone through the open link. The user enters her PIN or password or other putative secure identifier 1005 into the cell phone. The putative secure identifier is encrypted, sent back to the verifier, and compared 1105 with the bona fide secure identifier retrieved from the verifier-database. If there is no match, the transaction is rejected 1505, the retailer is notified 1705, and the user is notified 1805. Of course, as previously disclosed, the rejection routine may include allowing multiple attempts and analyzing time-outs, and notifying police authorities or initiating other appropriate responses. These steps are not shown in FIG. 5. The same verification steps and the same secure identifier are used regardless of which account the user has elected to debit; consequently, the user needs to remember only a single PIN or password in order to access any one of many accounts.

Alternatively, the system may be set up so the "list" of the user's available accounts is not contained on the proxy transaction card, but is kept in the verifier-database. Once the proxy transaction card is swiped and the communications link is opened between the retailer/merchant bank and the verifier, the verifier retrieves the list of available accounts from the verifier-database, opens the communications link with the user, and transmits the list of available accounts to the user communication device. The user then inputs her choice of account into the user communication device.

If the putative secure identifier and the bona fide secure identifier match 1105, then the verifier, acting as the user's proxy, opens a communications link to the appropriate credit provider 105 (i.e., VISA® account #1). This is possible because the verifier was provided with this account access information by the user during pre-enrollment. The verifier-computer passes the transaction through to the chosen account by transmitting 1905 the account information and details of the pending transaction to the credit provider. The credit provider then queries its database to determine whether the user's account has sufficient credit available to meet the transaction, and a decision is made 1205 whether or not to approve 1305 or reject 1405 the transaction. That decision is communicated to the verifier-computer 1605, which makes appropriate annotations in its database and notifies the retailer 1705 and the user 1805 so that the transaction can be completed or cancelled according to the instructions from the credit provider. All of the foregoing steps downstream of the initiation of the transaction can be performed automatically, without human intercession.

There are numerous and significant advantages of this embodiment of the invention. First, the consumer need not carry any credit cards, or any information identifying any of their accounts. Thus, the proxy transaction card issued by the verifier becomes a universal credit card because the proxy transaction card allows the consumer to access all of the consumer's credit card accounts securely without transmitting any account information over the merchant's or customer's communications devices. Second, the consumer need remember only one PIN to access all of her credit card accounts. Third, regardless of where in the world the user presents her proxy transaction card, no account numbers or other information regarding her accounts is transmitted from the point of sale. The only transmission of account information is from the centralized verifier to the credit provider. Consequently, security of account information transmission can be controlled and greatly enhanced. Fourth$_1$ the consumer's bank need not be involved in the electronic transaction because the verifier acts as the gateway to the credit card provider. Information flows from the retailer to and from the verifier, from the verifier to and from the user, and from the verifier to and from the credit card company.

SUMMARY

From the foregoing description, the novelty, utility, and means of constructing and practicing the invention will be readily apprehended. These disclosures of the preferred embodiments of the invention represent the best mode known to me as of the present date. It is to be understood that my invention is not limited to the embodiments disclosed above but encompasses any and all embodiments within the scope of the following claims.

The invention may be summarized, at least in part, by the following enumerated statements.

Statement 1. the invention comprises a user identity verification method for verifying the identity of a user by a verifier in the course of an electronic transaction, said user identity verification method comprising the steps of: (a) pre-enrolling the user, comprising the steps of: (a1) assigning to the user a bona fide secure identifier; and, (a2) storing the bona fide secure identifier in a database that is accessible to the verifier; (b) pre-enrolling a user communications device, wherein pre-enrolling the user communications device comprises the steps of: (b1) obtaining a user access number for the user communications device, wherein the user access number can be used to open a communications link with the user communications device; and, (b2) storing the user access number in a database that is accessible to the verifier; (c) retrieving the user access number stored at Step (b2); (d) opening a communications link between the verifier and the user communications device by using the user access number retrieved at Step. (c); (e) sending an identity verification request (IVR) from the verifier to the user through the communications link opened at Step (d); (f) inputting by the user a putative secure identifier; (g) sending through the communications link opened at Step (d) a response to the IVR of Step (e); (h) retrieving the bona fide secure identifier stored at Step (a2); (i) comparing the putative secure identifier input at Step (f) with the bona fide secure identifier retrieved at Step (h); and, (j) allowing the transaction to proceed only if the comparison of Step (i) results in a match between the putative secure identifier and the bona fide secure identifier.

Statement 2. the invention further comprises the method of Statement 1 wherein the response sent at Step (g) includes the putative secure identifier input at Step (f), and wherein Step (i) is performed by the verifier.

Statement 3. the invention further comprises the method of Statement 1 wherein Step (b) further comprises the step of: (b3) downloading local software to the user communications device.

Statement 4 the invention further comprises the method of Statement 3 wherein the IVR sent at Step (e) includes the bona fide secure identifier retrieved at Step (h), and wherein Step (i) is performed by the local software downloaded at Step (b3), and wherein the response sent at Step (g) includes the results of the comparison done at Step (i).

Statement 5. the invention further comprises the method of Statement 3 wherein the local software downloaded at Step (b3) performs at least one of: Step (g) and Step (i).

Statement 6. the invention further comprises the method of Statement 3 wherein the local software downloaded at Step (b3) performs the steps of: (k)receiving the IVR sent at Step (e); (l) formatting the IVR for display; and, (m) displaying the IVR formatted at Step (l) on an input/output (I/O) device of the user communications device.

Statement 7. the invention further comprises the method of Statement 3 wherein the local software downloaded at Step (b3) performs at least one of: decrypting information received by the user communications device, and encrypting information sent by the user communications device.

Statement 8. the invention further comprises the method of Statement 1 wherein at least one of the IVR of step (e) and the response of step (g) are encrypted when sent.

Statement 9. the invention further comprises the method of statement 1 further comprising the steps of:(n) sending a transaction authorization request to the user communications device;(o) sending a response to the transaction authorization request of Step (n); and, (p) allowing the transaction to proceed only if the response of Step (o) is to authorize the transaction.

Statement 10. the invention further comprises the method of Statement 9 further comprising pre-enrolling an account of the user, wherein pre-enrolling the account comprises setting a flag that indicates whether or not at least one of Steps (n) through (p) are to be performed.

Statement 11. the invention further comprises the method of Statement 1 further comprising pre-enrolling an account of the user, wherein pre-enrolling the account comprises setting a flag that indicates whether or not transaction authorization is to be performed.

Statement 12. the invention further comprises the method of Statement 1 further comprising pre-enrolling at least one account of the user, wherein pre-enrolling the account comprises the steps of: (q) acquiring access information for the account; and, (r)storing the account access information on a database that is accessible to the verifier.

Statement 13. the invention further comprises the method of Statement 12 further comprising the step of issuing to the user a proxy transaction card wherein the proxy transaction card can be used by the user to authorize the verifier to access the pre-enrolled account by utilizing the access information stored at step (r).

Statement 14. the invention further comprises the method of Statement 13 further comprising the steps of: (s) using the information contained on the proxy transaction card to open a communications link with the verifier; (t) displaying to the user the pre-enrolled accounts that the verifier is authorized to access; (u) selecting, by the user, which of the accounts displayed at Step (t) the verifier is to accesses; (v) accessing, by the verifier, the account selected at Step (u) using the account access information stored on the database of Step (r); and, (w) passing the transaction through to the account accessed at Step (v) if the transaction is allowed to proceed at Step (j).

Statement 15. the invention further comprises the method of Statement 1 wherein Step (b) further comprises the steps of: (b4) acquiring a device identifier of the user communications device; and, (b5) storing the device identifier in a database that is accessible to the verifier, and wherein the method further comprises the steps of: (x) retrieving the device identifier stored at Step (b5); (y) obtaining the device identifier of the user communications device; (z) comparing the device identifier retrieved at Step (x) with the device identifier obtained at Step (y); and, (aa) terminating the transaction if the device identifiers compared at Step (z) do not match.

Statement 16. the invention further comprises a system for verifying the identity of a user by a verifier during the course of an electronic transaction, said system comprising: a. a verifier-database (703); b. a verifier-computer (903), wherein said verifier-computer is adapted to write data to and retrieve data from said verifier-database; c. a first verifier communications device (2403) for receiving communications from the user and transmitting communications to the user, wherein said first verifier communications device is accessible to said verifier-computer; d. a user communications device (2303) for receiving communications from the verifier and transmitting communications to the verifier, wherein said user communications device is accessible to the user; e. an input/output (I/O) (503) device that accepts input from the user and displays output to the user; and, f. a user-computer (603) coupled to said user communication device and coupled to said I/O device, wherein said user-computer is adapted to: i) display on said I/O device an incoming identity verification request (IVR) sent to said user communications device by the verifier-computer through said verifier communications device; ii) acquire the user's input to said I/O device, wherein the user's input includes a putative secure identifier; and, iii) send a response to the IVR from said user communications device to said first verifier communications device, wherein at least one of said user-computer and said verifier-computer is adapted to: iv) receive as a first input a bona fide secure identifier retrieved from said verifier-database; v) receive as a second input the putative secure identifier: vi) compare the first input with the second input; and, vii) produce a confirmation output that indicates whether the first input matches the second input, wherein the electronic transaction is blocked unless the confirmation output indicates the first input and second input match.

Statement 17. the invention further comprises the system of Statement 16 wherein the user-computer is adapted to decrypt an encrypted incoming IVR sent by the verifier.

Statement 18. the invention further comprises the system of Statement 16 wherein the user-computer is adapted to encrypt the response.

Statement 19. the invention further comprises the system of Statement 16 wherein said user communications device is a personal communications device.

Statement 20. the invention further comprises the system of Statement 16 further comprising a second verifier communications device (803) for transmitting the confirmation output to a bank.

What is claimed is:

1. A user identity verification method for verifying the identity of a user by a verifier in the course of an electronic transaction, said user identity verification method comprising the steps of:

(a) pre-enrolling the user, comprising the steps of:

(a1) assigning to the user a bona fide secure identifier; and,
(a2) storing the bona fide secure identifier in a database that is accessible to the verifier;
(b) pre-enrolling a user communications device, wherein pre-enrolling the user communications device comprises the steps of:
(b1) obtaining a user access number for the user communications device, wherein the user access number can be used to open a communications link with the user communications device; and,
(b2) storing the user access number in a database that is accessible to the verifier;
(c) retrieving the user access number stored at Step (b2);
(d) opening a communications link between the verifier and the user communications device by using the user access number retrieved at Step (c);
(e) sending an identity verification request (IVR) from the verifier to the user through the communications link opened at Step (d);
(f) inputting by the user a putative secure identifier;
(g) sending through the communications link opened at Step (d) a response to the IVR of Step (e);
(h) retrieving the bona fide secure identifier stored at Step (a2);
(i) comparing the putative secure identifier input at Step (f) with the bona fide secure identifier retrieved at Step (h); and,
(j) allowing the transaction to proceed only if the comparison of Step (i) results in a match between the putative secure identifier and the bona fide secure identifier.

2. A system for verifying the identity of a user by a verifier during the course of an electronic transaction, said system comprising:
 a. a verifier-database (703);
 b. a verifier-computer (903), wherein said verifier-computer is adapted to write data to and retrieve data from said verifier-database;
 c. a first verifier communications device (2403) for receiving communications from the user and transmitting communications to the user, wherein said first verifier communications device is accessible to said verifier-computer;
 d. a user communications device (2303) for receiving communications from the verifier and transmitting communications to the verifier, wherein said user communications device is accessible to the user;
 e. an input/output (I/O) (503) device that accepts input from the user and displays output to the user; and,
 f. a user-computer (603) coupled to said user communication device and coupled to said I/O device, wherein said user-computer is adapted to:
  i) display on said I/O device an incoming identity verification request (IVR) sent to said user communications device by the verifier-computer through said verifier communications device;
  ii) acquire the user's input to said I/O device, wherein the user's input includes a putative secure identifier; and,
  iii) send a response to the IVR from said user communications device to said first verifier communications device,
 wherein at least one of said user-computer and said verifier-Computer is adapted to:
  iv) receive as a first input a bona fide secure identifier retrieved from said verifier-database;
  v) receive as a second input the putative secure identifier; and,
  vi) compare the first input with the second input;
 wherein the electronic transaction proceeds if the first input and second input match.

3. The system of claim 2 wherein said user communications device is a personal communications device.

4. The system of claim 2 further comprising a second verifier communications device (803) for transmitting a confirmation output to a bank.

5. A user identity verification method for verifying the identity of a user by a verifier in the course of an electronic transaction, said user identity verification method comprising the steps of:
(a) assigning a bona fide secure identifier to the user;
(b) storing the bona fide secure identifier of Step (a) in a database that is accessible to the verifier;
(c) storing a user access number for a user communications device in a database, wherein the database is accessible to the verifier, and wherein the user access number can be used to open a communications link with the user communications device;
(d) retrieving the user access number stored at Step (c);
(e) using the user access number retrieved at Step (d) to open a communications link between the verifier and the user communications device;
(f) sending an identity verification request (IVR) from the verifier to the user through the communications link opened at Step (e);
(g) inputting by the user a putative secure identifier;
(h) receiving through the communications link opened at Step (e) a response to the IVR of Step (f);
(j) retrieving the bona fide secure identifier stored at Step (b); and,
(k) comparing the putative secure identifier input at Step (g) with the bona fide secure identifier retrieved at Step (j),
wherein the transaction proceeds if the comparison of Step (k) results in a match between the putative secure identifier and the bona fide secure identifier.

6. The method of claim 5 wherein the response received at Step (h) includes the putative secure identifier input at Step (g), and wherein Step (k) is performed by the verifier.

7. The method of claim 5 further comprising the step of:
(m) downloading local software to the user communications device.

8. The method of claim 7 wherein the IVR sent at Step (f) includes the bona fide secure identifier retrieved at Step (j), and wherein Step (k) is performed by the local software downloaded at Step (m), and wherein the response received at Step (h) includes the results of the comparison done at Step (k).

9. The method of claim 7 wherein the local software downloaded at Step (m) performs at least one of: (i)sending the response received at Step (h) and,(ii) Step (k).

10. The method of claim 7 wherein the local software downloaded at Step (m) performs the steps of:
(n) receiving the IVR sent at Step (f);
(o) formatting the IVR for display; and,
(p) displaying the IVR formatted at Step (o) on an input/output (I/O) device of the user communications device.

11. The method of claim 7 wherein the local software downloaded at Step (m) performs at least one of: (i) decrypting information received by the user communications device, and (ii) encrypting information sent by the user communications device.

12. The method of claim 5 wherein at least one of the IVR of Step (f) and the response received at Step (h) are encrypted when sent.

13. The method of claim 5 further including authorizing the transaction, said authorizing comprising the steps of:
(q) sending a transaction authorization request to the user communications device;
(r) receiving a response to the transaction authorization request of Step (q); and,
(s) allowing the transaction to proceed only if the response received at Step (r) is to authorize the transaction.

14. The method of claim 13 further comprising the step of:
(t) setting a flag in a database record, wherein the flag is associated with an account of the user and wherein the flag indicates whether or not at least one of Steps (q) through (s) are to be performed with respect to that account.

15. The method of claim 5 further comprising the step of:
(u) setting a flag in a database record, wherein the flag is associated with an account of the user and wherein the flag indicates whether or not transaction authorization is to be performed.

16. The method of claim 5 further comprising the steps of:
(v) acquiring access information for an account of the user; and,
(w) storing the account access information on a database that is accessible to the verifier.

17. The method of claim 16 further comprising the steps of:
(x) issuing to the user a proxy transaction card containing data that can be used to authorize the verifier to access the account of Step (v);
(y) using the data contained on the proxy transaction card to authorize the verifier to access the account of Step (v);
(z) retrieving the account access information stored at Step (w); and,
(aa) the verifier using the account access information retrieved at Step (z) to access the account of Step (v) upon authorization at Step (y),
wherein the transaction is made with respect to or debited to the account accessed at Step (aa).

18. The method of claim 17, further comprising the steps of:
(bb) displaying to the user at least one account the verifier is authorized to access; and,
(cc) inputting by the user a choice as to which account displayed at Step (bb) the verifier is authorized to access.

19. The method of claim 5 further comprising the steps of:
(dd) storing a device identifier of the user communications device of Step (c) in a database that is accessible to the verifier;
(ee) retrieving the device identifier stored at Step (dd);
(ff) obtaining the device identifier of the user communications device of Step (e); and,
(gg) comparing the device identifier retrieved at Step (ee) with the device identifier obtained at Step (ff);
wherein the transaction is allowed to proceed only if the comparison of Step (gg) results in a match between the device identifier retrieved at Step (ee) and the device identifier obtained at Step (ff).

* * * * *